United States Patent
Bassett et al.

(10) Patent No.: US 10,558,299 B2
(45) Date of Patent: Feb. 11, 2020

(54) CALIBRATION OF AN INPUT DEVICE TO A DISPLAY USING THE INPUT DEVICE

(71) Applicant: Hewlett-Packard Development Company, L.P., Houston, TX (US)

(72) Inventors: Jonathan D. Bassett, Fort Collins, CO (US); Fred Charles Thomas, III, Fort Collins, CO (US); Lauren M. Domingo, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 166 days.

(21) Appl. No.: 15/543,212

(22) PCT Filed: Jan. 30, 2015

(86) PCT No.: PCT/US2015/013875
§ 371 (c)(1),
(2) Date: Jul. 12, 2017

(87) PCT Pub. No.: WO2016/122626
PCT Pub. Date: Aug. 4, 2016

(65) Prior Publication Data
US 2018/0004350 A1 Jan. 4, 2018

(51) Int. Cl.
*G06F 3/041* (2006.01)
*G06F 3/0354* (2013.01)
(Continued)

(52) U.S. Cl.
CPC ............ *G06F 3/0418* (2013.01); *G06F 3/038* (2013.01); *G06F 3/0321* (2013.01);
(Continued)

(58) Field of Classification Search
None
See application file for complete search history.

(56) References Cited

U.S. PATENT DOCUMENTS

| 7,536,051 | B2 | 5/2009 | Lin et al. |
| 8,692,212 | B1 | 4/2014 | Craft et al. |

(Continued)

FOREIGN PATENT DOCUMENTS

| CN | 102224484 | 10/2011 |
| CN | 103026321 | 4/2013 |

(Continued)

OTHER PUBLICATIONS

Casio Interactive Whiteboard, May 22, 2013, pp. 1-89, Casio Computer Co., Ltd., Tokyo, Japan.

*Primary Examiner* — Stephen T. Reed
(74) *Attorney, Agent, or Firm* — Wall & Tong LLP

(57) ABSTRACT

Examples disclosed herein involve calibrating an input device to a display using the input device. An example method includes determining first coordinates of a position-encoded film corresponding to a location of an input device relative to the position-encoded film of a display of a computing device based on first position points of the position-encoded film, determining second coordinates of a pixel array corresponding to the location of the input device relative to the pixel array of the display based on a first reference pixel of the display, measuring a first offset between the first coordinates of the position-encoded film and the second coordinates of the pixel array, and calculating a calibration transformation to control the computing device based on the first offset.

15 Claims, 7 Drawing Sheets

(51) Int. Cl.
    *G06F 3/03*         (2006.01)
    *G06F 3/038*       (2013.01)
    *G06T 7/73*         (2017.01)

(52) U.S. Cl.
    CPC ........ *G06F 3/0383* (2013.01); *G06F 3/03545* (2013.01); *G06T 7/74* (2017.01)

(56) References Cited

U.S. PATENT DOCUMENTS

| | | |
|---|---|---|
| 2002/0046887 A1 | 4/2002 | Yanagisawa et al. |
| 2011/0291998 A1 | 12/2011 | Adams et al. |
| 2012/0263381 A1* | 10/2012 | Yoshida .............. G06F 3/03545 382/189 |
| 2013/0314313 A1* | 11/2013 | Ericson .............. G06F 3/03545 345/156 |
| 2014/0062964 A1* | 3/2014 | Nagaoka .............. G06F 3/0321 345/175 |
| 2014/0118310 A1* | 5/2014 | Black .................. G06F 3/03545 345/178 |
| 2014/0168173 A1 | 6/2014 | Idzik et al. |

FOREIGN PATENT DOCUMENTS

| | | |
|---|---|---|
| EP | 2743803 A1 | 6/2014 |
| KR | 1020140086061 A | 7/2014 |
| TW | 201339909 A | 10/2013 |
| TW | M470283 | 1/2014 |
| TW | 201428580 A | 7/2014 |
| TW | 201435679 A | 9/2014 |
| TW | 201500977 A | 1/2015 |
| WO | WO-2010015881 A1 | 2/2010 |

\* cited by examiner

US 10,558,299 B2

CALIBRATION OF AN INPUT DEVICE TO A DISPLAY USING THE INPUT DEVICE

BACKGROUND

An input device (e.g., a digital pen, a mouse, a pointer, etc.) may be used in conjunction with display devices (e.g., touchscreen devices) to control a computing device. For example, a user may handle a digital pen to input information into a computing device (e.g., a laptop computer, a desktop computer, a tablet computer, a mobile device (e.g., a smartphone), etc.). In some instances, the user may make gestures or move the digital pen to create corresponding media, text, messages, commands, etc. The input device may detect or capture its movement (e.g., handwriting, brush strokes, etc.) caused by the user to convert information corresponding to the movement (e.g., text, drawings, commands, etc.) into digital data.

Figure 1:
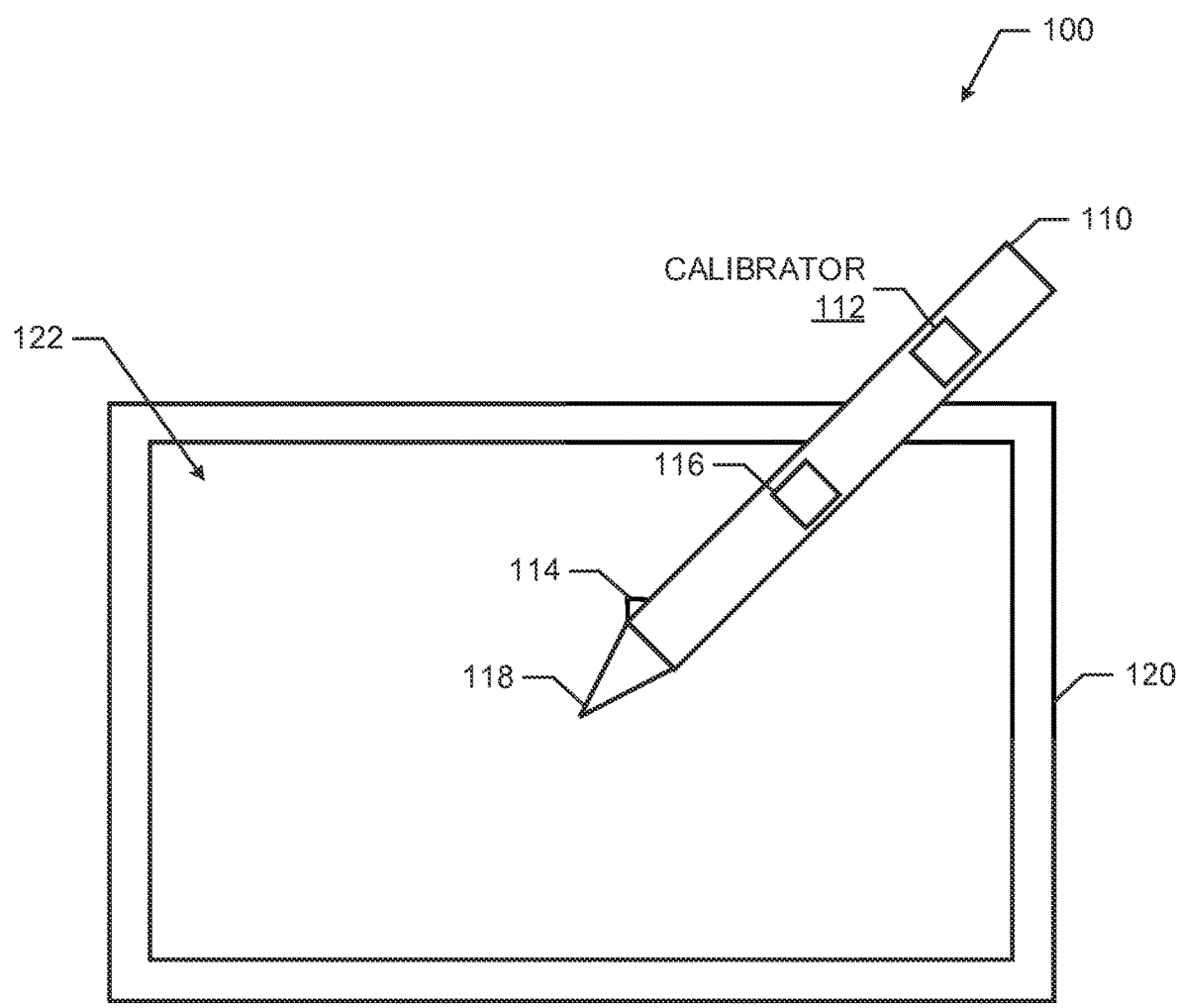
FIG. 1 illustrates a schematic diagram of an example computing system may be implement an example input device including a calibrator constructed in accordance with the teachings of this disclosure.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part is in contact with another part means that there is no intermediate part between the two parts.

DETAILED DESCRIPTION

Examples disclosed herein involve calibrating an input device to a display of a computing device using the input device. In examples disclosed herein, the input device may use a sensor to detect its position relative to a position-encoded film of a display and a pixel array of the display. The input device may identify misalignment between the position-encoded film of the display and the pixel array of the display and account for the misalignment by calculating a calibration transformation that is to be used to control the computing device.

A position-encoded film on a display of a computing device (e.g., a laptop computer, a desktop computer, a tablet computer, etc.) may be used by an input device (e.g., a digital pen) to determine its location relative to a display. The position-encoded film includes a positional encoded pattern of positioning points (e.g., identifiable or detectable dots, marks, etc.). The positioning points may not be detectable to the human eye such that they do not affect viewing of the display. For example, the positioning points may be comprised of infrared (IR) ink or near IR ink that may be detected by an IR sensor or camera capable of detecting IR light. An input device may continuously or repeatedly emit IR light and capture images of the position encoded film (and reflected IR light) and analyze the images to determine the location of the input device relative to the position-encoded film based on the captured images and a geometric location of the input device 110 (using any suitable techniques).

In some instances, a position-encoded film may not be appropriately positioned on a display to properly correspond to a layout of the display. In other words, the position-encoded film may not be properly aligned with the display. This may be due to manufacturing error, user placement error, sliding of the position-encoded film over time, etc. For example, the film may be off-center or off-axis with the display in a way that inhibits control or proper operation of the computing device because the input device "thinks" it is in a different location on the display than it actually is. Examples disclosed herein may be used to calibrate an input device for use with a position-encoded film and a display of a computing device using the input device, itself. Examples disclosed herein provide for increase accuracy (e.g., within 300 microns) in calibrating the input device to a display than previous techniques.

An example apparatus disclosed herein includes a location detector to determine first coordinates of a position-encoded film corresponding to a location of the apparatus relative to the position-encoded film of a display of a computing device and second coordinates of a pixel array corresponding to the location of the apparatus relative to a pixel layer of the display, an offset calculator to determine a first offset between the first coordinates and the second coordinates, and an interface manager to calculate a calibration transformation for control of the computing device based on the first offset.

An example method disclosed herein includes determining first coordinates of a position-encoded film corresponding to a location of an input device relative to the position-encoded film of a display of a computing device based on first position points of the position-encoded film; determining second coordinates of a pixel array corresponding to the location of the input device relative to the pixel array of the display based on a first reference pixel of the display; measuring a first offset between the first coordinates of the position-encoded film and the second coordinates of the pixel array; and calculating a calibration transformation to control the computing device based on the first offset.

FIG. 1 is a schematic diagram of an example computing system 100 including an input device 110 constructed in accordance with the teachings of this disclosure. The example computing system 100 includes the input device 110 and a computing device 120. In examples disclosed herein; the input device 110 is used to control the computing device 120 of FIG. 1. The input device 110 of FIG. 1 may be communicatively coupled with the computing device 120 via a wireless communication link (e.g., Bluetooth, Wi-Fi, etc.) or wired communication link (e.g., Universal Serial Bus (USB).

In the illustrated example of FIG. 1, the input device 110 is a digital pen, though the input device 110 may be implemented by other types of input devices (e.g., a mouse, a pointer remote, etc.). The input device 110 facilitates user control of the computing device 120. For example, a user may use the input device 110 to draw images, write text, select items on the display 122 (e.g.; by touching a part of the display 122 presenting an icon associated with the item or clicking a button of the input device 122). The example input device 110 includes a sensor 114 to read or detect items (e.g., position information, reference pixels, etc.) on the display 122 in accordance with the teachings of this disclosure. The example sensor 114 of FIG. 1 may be implemented by a camera or other type of optical sensor (e.g., infrared (IR) sensor).

The input device 110 of FIG. 1 includes a device pointer 118. The device pointer 118 of the example input device 110 may be physically contacted with the display 122 to control the computing device 120. The input device 110 of FIG. 1 includes an input controller 116 (e.g., which may be implemented partially or entirely by the processor platform 700 of FIG. 7) to facilitate control of the input device 110 or computing device 120. Accordingly, the input controller 116 may control power settings, control settings, communication settings, user interaction, etc. of the input device 110. For example, the input controller 116 may detect contact with the display 122 via the device pointer 118 and control the computing device 120 based on the contact with the screen. The example input device 110 may also include position sensors, such as an accelerometer, that monitor, measure, or determine an orientation or movement of the input device 110. The example input controller 116 may control the input device 110 or computing device 120 based on measurements of the position sensors.

The input device 110 in the illustrated example of FIG. 1 includes a calibrator 112. The example calibrator 112 of FIG. 1 may be used to calibrate the input device 110 to control the computing device 120 in accordance with the teachings of this disclosure. The calibrator 112 of FIG. 1 uses position information detected or captured by the sensor 114 (as disclosed below) to adjust settings of the input device 110 or computing device 120 to control or calibrate the input device 110 or the computing device 120. An example implementation of the calibrator 112 is disclosed below in connection with FIG. 2.

The example computing device 120 of FIG. 1 may be any type of computing device (e.g., a laptop computer, a desktop computer, a tablet computer, etc.). The computing device 120 of FIG. 1 includes a display 122. The example display 122 of FIG. 1 may be a liquid crystal display (LCD), a light emitting diode (LED) display, or any other type of display. Accordingly, the example display 122 of FIG. 1 includes a pixel array comprised of LCD pixels, LED pixels, etc. In some examples, the display 122 of FIG. 1 is a touchscreen to facilitate receiving user input by touching the display 122 with the input device 110 or with a hand or finger (or any other touch of a user). In examples disclosed herein, the display 122 may be used in accordance with the input device 110 to calibrate the input device 110 to the display 122 to enhance control of the computing device 120 when using the input device 110 (e.g., by increasing accuracy of detecting touch locations of the input device 110 on the display 122).

The example display 122 of FIG. 1 includes a positional encoded pattern of position points (see FIG. 4) to enable the input device 110 to determine its location relative to the display 122 or to layers of the display (e.g., during calibration, during operation, etc.). The example positional encoded pattern may be included on a position-encoded film or layer of the display 122 (e.g., a position-encoded film on an exterior surface (e.g., a cover glass) of the display 122, a layer of position-encoded film between a cover glass of the display 122 and a pixel layer of the display, etc.). The example position-encoded film may be attached to the display 122 during manufacturing or after manufacturing. For example, the position-encoded film may be a removable film that can be replaced or adjusted on the display 122. The position points of the positional encoded pattern of the position-encoded film may be comprised of identifiable or detectable (e.g., via IR light) dots, marks, etc. as described above. Accordingly, the display 122 of FIG. 1 is used to indicate a position of the input device 110 relative to a position-encoded film of the display 122 and a pixel array of the display to facilitate control of the computing device 120.

In some examples disclosed herein, a holder may be used to hold the input device 110 in a still positioning over the display 122 of the computing device 120. For example, such a holder may attached to the computing device 120 or the display 122 to increase stability of the input device 110 relative to the display 122 or computing device 120.

Figure 2:
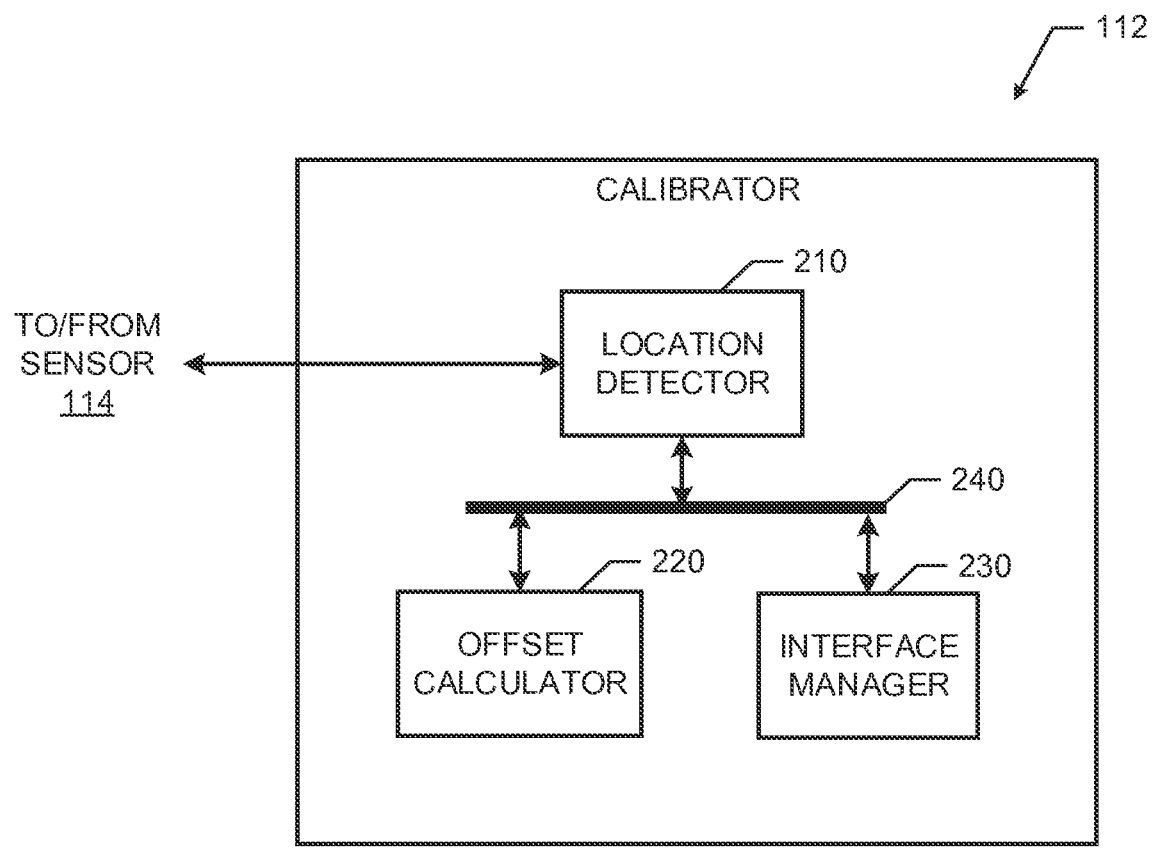
FIG. 2 a block diagram of an example calibrator that may be used to implement the calibrator of FIG. 1 in accordance with the teachings of this disclosure.

FIG. 2 is a block diagram of an example calibrator 112 that may be used to implement the calibrator 112 of FIG. 1. The example calibrator 112 of FIG. 2 includes a location detector 210, an offset calculator 220, and an interface manager 230. The calibrator 112 in the illustrated example of FIG. 2 includes a communication bus 240 to facilitate communication between the location detector 210, the offset calculator 220, and the interface manager 230.

The example location detector 210 of FIG. 2 controls a sensor (e.g., the sensor 114) of an input device (e.g., the input device 110) to determine calibration points of the input device in accordance with the teachings of this disclosure. As used herein, a calibration point is a position of an input device (e.g., the input device 110) relative to a computing device (e.g., the display 122 or a position point of the display 122) during calibration of the input device 110 and the display 122. In other words, a calibration point is a position or location of the input device 110 (or portion of the input device, such as the device pointer 118) on the display 122 while capturing images of the position-encoded film and pixel array for calibrating the input device 110 to the display 122. The location detector 210 of FIG. 2 determines a geometric location of a position-encoded film of the display 122 relative to a geometric location of a pixel array of the display 122 (e.g., based on a location of a reference pixel or reference pixels within a pattern of the position-encoded film). In some examples, the location detector 210 detects patterns of the position-encoded film of the display device 122 to determine a location of the input device relative to the position-encoded film of the display 122. The location detector 210 of FIG. 2 may also detect reference pixel locations presented on the display 122 to determine a location of the input device 110 relative to a pixel array of the display 122 or a geometric location of the position-encoded film relative to the pixel array. In examples disclosed herein, at each calibration point, the location detector 210 determines the position of the input device 110 relative to a position-encoded film of the display 122 and a position of the input device 110 relative to a pixel array of the display 122 in accordance with the teachings of this disclosure. An example implementation of the location detector 210 is disclosed below in connection with FIG. 3.

The example offset calculator 220 of FIG. 2 calculates an offset between a location of the input device 110 relative to a position-encoded film of the display 122 and a location of the input device relative to a pixel array of the display 122. Accordingly, the offset calculator 220 may receive position information (e.g., x-y coordinates of the position-encoded film) of the input device 110 relative to the position-encoded film and position information (e.g., x-y coordinates of a pixel array) of the input device 110 relative to the pixel array of the display 122. Based on the position information (e.g., x-y coordinates), the offset calculator 220 may determine an offset (e.g., a difference in position) between the position-encoded film of the display 122 and a pixel array of the display 122.

In some examples, the offset calculator 220 of FIG. 2 calculates multiple offsets between multiple locations of the input device 110 and corresponding locations of the position-encoded film and pixel array. Thus, the offset calculator 220 may iteratively calculate offsets determined by the input device 110 between the position-encoded film and the pixel array of the display 122. For example, a first offset may be calculated for a first calibration point located near a first location (e.g., an upper left corner) of the display 122 and second offset may be calculated for a second a calibration point located near a second location (e.g., a bottom right corner) of the display 122. The example offset calculator 220 provides offset calculations to the interface manager 230 for calibration of the input device 110 to control the computing device 120.

The example interface manager 230 of FIG. 2 calculates calibration transformation for control of a computing device (e.g., the computing device 120) based on the determined offset or offsets calculated by the offset calculator 220. For example, based on the calculated offsets the interface manager 230 may determine rotation, translation, scaling, distortion, etc. of a position-encoded film of the display 122. In such an example, based on the determined characteristics of the display 122 (e.g., the geometric location of the position-encoded film), the interface manager 230 may instruct the input controller 116 to adjust control settings for the computing device 120 based on the calibration transformation. More specifically, when the device pointer 118 contacts the display 122 at a particular location, the input device 110 may provide different control coordinates of the touched location than those that were provided prior to calculating the calibration transformation and adjusting control settings based on the calibration transformation. Thus, in examples disclosed herein, the calibrator 112 of the input device 110 calibrates the input device 110 with the display 122 to provide enhanced control (e.g., increased accuracy) of the computing device 120.

While an example manner of implementing the calibrator 112 of FIG. 1 is illustrated in FIG. 2, at least one of the elements, processes or devices illustrated in FIG. 2 may be combined, divided, re-arranged, omitted, eliminated or implemented in any other way. Further, the location detector 210, the offset calculator 220, the interface manager 230, or, more generally, the example calibrator 112 of FIG. 2 may be implemented by hardware or any combination of hardware and executable instructions (e.g., software or firmware). Thus, for example, any of the location detector 210, the offset calculator 220, the interface manager 230, or, more generally, the example calibrator 112 could be implemented by at least one of an analog or digital circuit, a logic circuit, a programmable processor, an application specific integrated circuit (ASIC), a programmable logic device (PLO) or a field programmable logic device (FPLD). When reading any of the apparatus or system claims of this patent to cover a purely software or firmware implementation, at least one of the location detector 210, the offset calculator 220, or the interface manager 230 is/are hereby expressly defined to include a tangible computer readable storage device or storage disk such as a memory, a digital versatile disk (DVD), a compact disk (CD), a Blu-ray disk, etc. storing the executable instructions. Further still, the example calibrator 112 of FIG. 2 may include at least one element, process, or device in addition to, or instead of, those illustrated in FIG. 2, or may include more than one of any or all of the illustrated elements, processes and devices.

Figure 3:
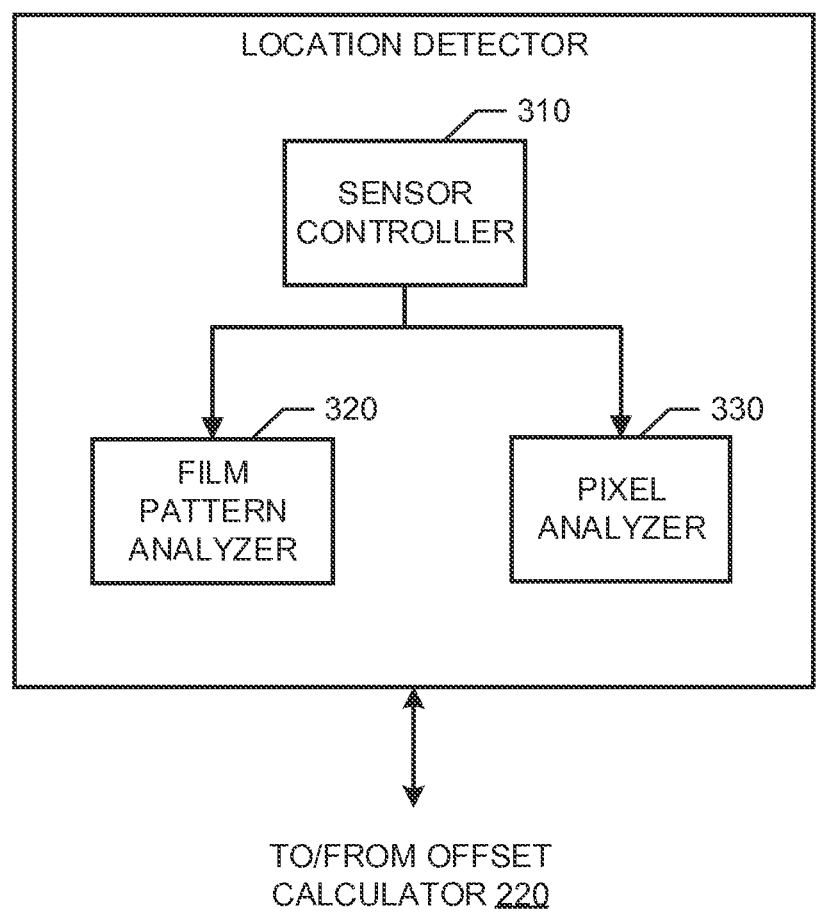
FIG. 3 is a block diagram of an example location detector that may be implemented by the calibrator of FIG. 2 in accordance with the teachings of this disclosure.

FIG. 3 is a block diagram of an example location detector 210 that may be used to implement the location detector 210 of the calibrator 112 of FIG. 2. The example location detector 210 of FIG. 3 includes a sensor controller 310, a film pattern analyzer 320, and a pixel analyzer 330. The example location detector 210 of FIG. 3 determines a location of an input device (e.g., the input device 110) by analyzing images of a position-encoded film and reference pixels of a pixel array. In examples disclosed herein, the location detector 210 of FIG. 3 may communicate with an offset calculator (e.g., the offset calculator 220) or other component of a calibrator (e.g., the calibrator 112) of an input device (e.g., the input device 110) to facilitate calibration of the input device to a display (e.g., the display 122).

The example sensor controller 310 of FIG. 3 controls the sensor 114 (e.g., a camera or other optical sensor) of the input device 110 to capture images of the display 122 of the computing device 120. The sensor controller 310 may adjust settings of the sensor 114 for capturing images based on intended targets of the captured images. For example, first settings may be used to capture images of the position-encoded film (or a position encoded pattern) of the display 122 and second settings may be used to capture images of a reference pixel of a pixel array of the display 122. More specifically, the sensor controller 310 may instruct the sensor 114 to detect IR light (e.g., using an optical band-pass filter) to detect position points of the position-encoded film. In such an example, the sensor controller 310 may also control an IR emitter of the sensor 114 for detecting the position points of the position-encoded film. Further, the sensor controller 310 of FIG. 3 may instruct the sensor 114 to adjust settings to detect reference pixels (e.g., pixels at a designated location (e.g., a corner, a center, etc.) of the pixel array) that are illuminated for detection by the sensor 114. For example, the sensor controller 310 may implement a near IR filter to capture images of the pixel array (and reference pixel(s)). More specifically, the sensor controller 310 may adjust filters of the sensor 114 to detect pixel emitted longer visible wavelength light (e.g., the color 'red') from the reference pixels. In other words, for example, the reference pixels may be red. Furthermore, in some examples, to capture images of the pixels or reference pixels, the sensor controller 310 may turn off an IR emitter of the sensor 114, turn up a again of the sensor 114, control an exposure time for the image acquisition, control of extended image integration (e.g., with near IR filter or without near IR filter), etc.

In some examples, the sensor controller 310 may instruct the computing device 120 (e.g., via the calibrator or input device communication link with the computing device 120) to present the reference pixel in a particular manner. For example, the sensor controller 310 may request the computing device 120 to maximize a brightness or color (e.g., red) of the reference pixel. In such examples, this may increase an amount of light to pass through an IR filter of the sensor 114. In some examples, when using a holder, a shroud may be used around the input device 110 to limit an amount of ambient light to be detected. Accordingly, in such examples, the sensor controller 310, via the calibrator 112, input device 110, or computing device 120 may signal to a user to place the input device 110 within a holder or within a shrouded holder. In some examples, the sensor controller 310 may determine characteristics of an environment of the input device 110 or display 122 and instruct the sensor, the computing device 120, or a user of the input device to adjust respective settings for calibrating the input device 110 to the display 122 based on the determined characteristics.

After the sensor controller 310 of FIG. 3 determines or provides appropriate settings for capturing images of the display 122 to the sensor 114, the sensor controller 310 receives or retrieves corresponding images of the display 122. The sensor controller 310 of FIG. 3 forwards images of the position-encoded film of the display 122 to the film pattern analyzer 320 and images of the reference pixels or pixel array of the display 122 to the pixel analyzer 330. In some examples, the same images including both the position-encoded film and the reference pixel(s) may be sent to both the film pattern analyzer 320 and the pixel analyzer 330 for analysis. The example film pattern analyzer 320 and the example pixel analyzer 330 may be implemented by an image processor or multiple image processors.

The example film pattern analyzer 320 of FIG. 3 identifies a pattern of the position-encoded film of the display 122. For example, the film pattern analyzer 320 may identify all or part of a position encoded pattern comprised of position points on the position-encoded film. Accordingly, the film pattern analyzer 320 may analyze the image and detect patterns of position points captured by the sensor 114 using any suitable image processing technique.

Based on the identified pattern, the film pattern analyzer 320 of FIG. 3 may determine a position of the input device 110 relative to the position-encoded film of the display 122. In examples disclosed herein, the position encoded pattern of the position-encoded film may be standard or programmed to the input device (e.g., stored on a memory of the input device 110 or the computing device 120). Accordingly, the film pattern analyzer 310 may cross-reference the detected pattern with the position encoded pattern of the position-encoded film to determine a location of the input device 110 relative to the position-encoded film. In some examples, the film pattern analyzer 320 may consider an orientation of the input device 110 when the images were captured (e.g., by retrieving or receiving orientation data/information from an accelerometer of the input device 110). Therefore, the film pattern analyzer 320 may detect patterns that exactly match portions of the position encoded pattern of the position-encoded film (e.g., when the input device was place perpendicular to the position-encoded film) or patterns that are similar or proportional to a portion of the position encoded pattern due to an orientation of the input device 110. Accordingly, the pixel analyzer 330 may determine coordinates of the pixel array corresponding to the location of the input device 110 relative to the pixel array of the display 122. Accordingly, the film pattern analyzer 320 may determine x-y coordinates of the position-encoded film corresponding to the location of the input device 110 relative to the position-encoded film of the display 122 (see FIG. 4A).

The example pixel analyzer 330 of FIG. 3 identifies a reference pixel or several reference pixels in the pixel array of the display 122. In some examples, the pixel analyzer 330 may identify a corner pixel of the pixel array of the display in the captured image received from the sensor controller 310. In some examples, the pixel analyzer 330 may detect a designated reference pixel in the pixel array. For example, designated reference pixel may be detected based on characteristics of the reference pixel (e.g., color, location, etc.). In some examples, a plurality of reference pixels may be used. Based on a location of the detected reference pixel in the captured image, the pixel analyzer 330 may determine a location of the input device 110 relative to the pixel array of the display 122. Because the reference pixel is at a fixed or known position, the pixel analyzer 330 may determine the location of the input device 110 relative to the pixel array of the display 122 by determining a distance and direction from the reference pixel (or set of reference pixels). In some examples, similar to the film pattern analyzer 320, the pixel analyzer 330 may consider an orientation of the input device 110 based on measurements taken by an accelerometer at the time the image of the reference pixel(s) was captured. Accordingly, the pixel analyzer 330 may determine coordinates of the pixel array corresponding to the location of the input device 110 relative to the pixel array of the display 122 (see FIG. 4B).

While an example manner of implementing the location detector 210 of FIG. 2 is illustrated in FIG. 3, at least one of the elements, processes or devices illustrated in FIG. 3 may be combined, divided, re-arranged, omitted, eliminated or implemented in any other way. Further, the sensor controller 310, the film pattern analyzer 320, the pixel analyzer 330 or, more generally, the example location detector 210 of FIG. 3 may be implemented by hardware or any combination of hardware and executable instructions (e.g., software or firmware). Thus, for example, any of the sensor controller 310, the film pattern analyzer 320, the pixel analyzer 330 or, more generally, the example location detector 210 could be implemented by at least one of an analog or digital circuit, a logic circuit, a programmable processor, an application specific integrated circuit (ASIC), a programmable logic device (PLD) or a field programmable logic device (FPLD). When reading any of the apparatus or system claims of this patent to cover a purely software or firmware implementation, at least one of the sensor controller 310, the film pattern analyzer 320, or the pixel analyzer 330 is/are hereby expressly defined to include a tangible computer readable storage device or storage disk such as a memory, a digital versatile disk (DVD), a compact disk (CD), a Blu-ray disk, etc. storing the executable instructions. Further still, the example location detector 210 of FIG. 3 may include at least one element, process, or device in addition to, or instead of, those illustrated in FIG. 3, or may include more than one of any or all of the illustrated elements, processes and devices.

Figure 4A:
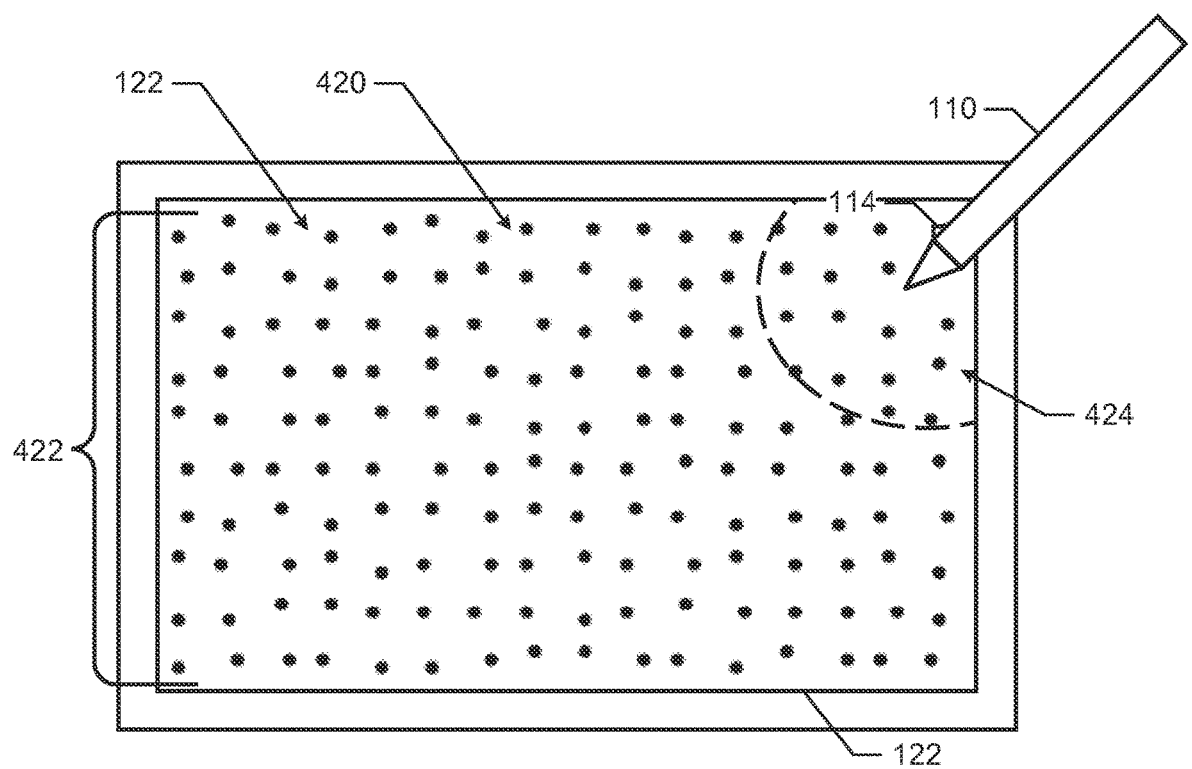
FIGS. 4A and 4B illustrate example images of a display of the computing system of FIG. 1 that may be analyzed by the example input device of FIG. 1, the example calibrator of FIG. 2, or the example location detector of FIG. 3 to calibrate the input device to the display in accordance with the teachings of this disclosure.
Figure 4B:
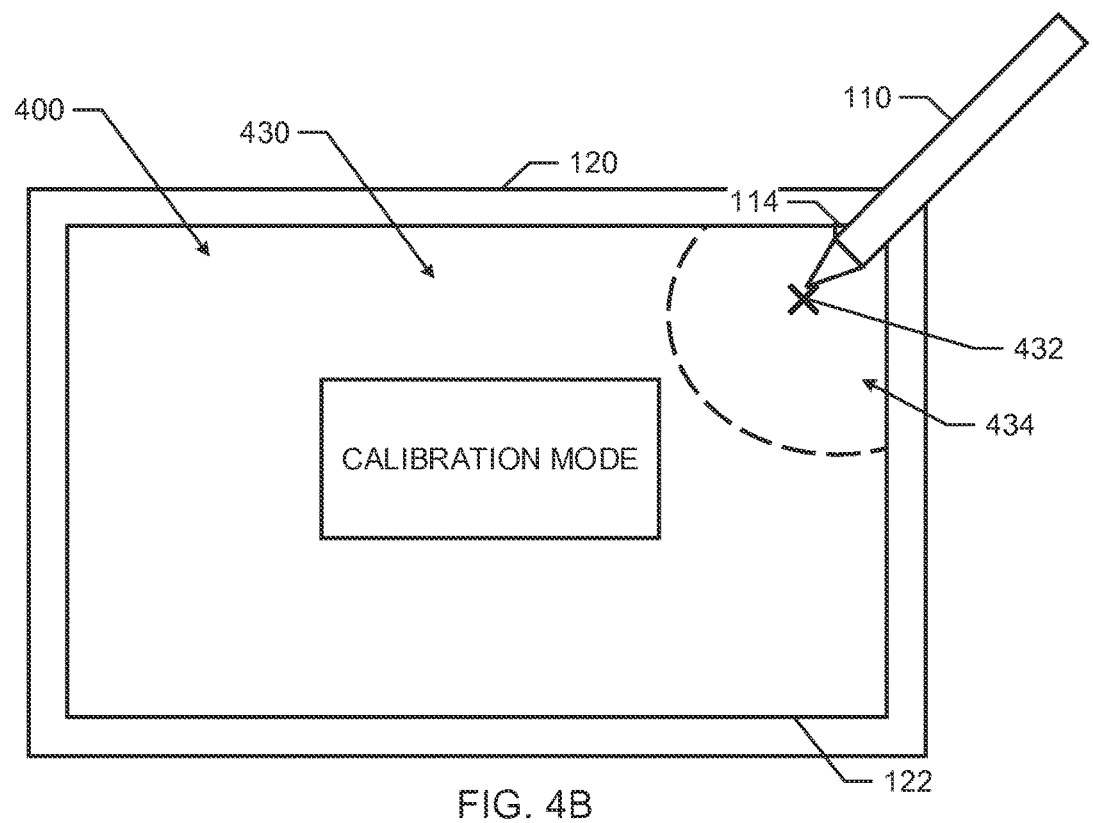

FIGS. 4A and 4B illustrate example images of the display 122 of FIG. 1 that may be analyzed by the input device 110 of FIG. 1, the calibrator 112 of FIG. 2, or the location detector 210 of FIG. 3 to calibrate the input device 110 to the display 122 in accordance with the teachings of this disclosure. FIG. 4A illustrates an example image of a position-encoded film 420 of the display 122 and FIG. 4B illustrates an example image of a pixel array 430 of the display 122. The example images of the position-encoded film 420 and the pixel array 430 may be captured during a calibration process (sequentially in any order or simultaneously) in accordance with the teachings of this disclosure. In some examples, the input device 110 is located in a same position or nearly the same position relative to the display 122 in both FIGS. 4A and 4B.

In the illustrated example of FIG. 4A, the position-encoded film 420 of the display 122 may be located above or below a cover glass of the display 122. The example position-encoded film 420 is comprised of a plurality of position points 422 that are distributed throughout the position-encoded film 420 to form a position encoded pattern. The example position points 422 of FIG. 4A are not uniformly distributed such that the input device 110 may identify its position relative to the position-encoded film during control operations (i.e., operations to control the computing device 120) and calibration. Accordingly, the example input device 110 has access to the position encoded pattern of the position points 422 to determine its location relative to the position-encoded film 420. In some examples, the position-encoded film 420 may only be detectable using IR light. Therefore, the example image of the position-encoded film and position points may be considered to have been taken under infrared light.

In FIG. 4A, the example input device 110 may detect the position points 422 within an area 424 (denoted by the dashed line) to determine a location of the input device 110 relative to the position-encoded film 420. The example area 424 of FIG. 4A may be an area within a range of the sensor 114 of the input device 110. Thus, in FIG. 4A, to determine a location of the input device 110 relative to the position-encoded film, the input device 110 may project IR light in area 424 of the position-encoded film and capture an image of the area 424. Based on the detected pattern 426 of the position points 422 within the area 424, the input device 110 may determine its location relative to the position-encoded film 420 of the display 122. For example, the film pattern analyzer 320 may compare the pattern captured within the area 424 to a stored copy or version of the position encoded pattern of the position-encoded film 420 to determine the location of the input device 110 relative to the position-encoded film 420. By matching the captured pattern to the stored (or known) position encoded pattern, the film pattern analyzer 320 determines the location of the input device 110 using any suitable image processing and analysis (e.g., orientation analysis of the input device 110).

The example pixel array 430 of FIG. 4B is any suitable pixel array (e.g., LCD, LED, etc.) used to present media, information, applications, etc. to a user via the display. For example, the pixel array 430 may present a desktop, a background image, an application (e.g., a calibration application) etc. In the illustrated example of FIG. 4B, the pixel array 430 of the display 122 is presenting a reference pixel 432 to be detected by the input device 110 for calibrating the input device 110 to the display 122. In FIG. 4B, the pixel array 430 also is presenting a message 434 to a user (a person calibrating the input device 110 to the display 122). In some examples, the message 434 may instruct the user to place the input device 110 at a particular location (e.g., above the reference pixel 432). In the illustrated example of FIG. 4B, the reference pixel 430 is located in an upper right corner of the display 422. In some examples, the reference pixel 432 may be an actual corner pixel (e.g., the upper right corner pixel of the display 122) or a pixel located at any other position of the pixel array 430. In some examples, the display 122 may present the reference pixel 432 with certain characteristics (e.g., color, brightness, etc.) such that the input device 110 may detect the reference pixel 432. Additionally or alternatively, a plurality of reference pixels similar to the reference pixel 432 may be presented (e.g., to present a particular shape or pattern on the display 122). In some examples, the input device 110 or computing device 120 may communicate settings or instructions for presenting or detecting the reference pixel 432.

In FIG. 4B, the example input device 110 detects the reference pixel 432 when the reference pixel is within an image capture area 434 of the sensor 114 (e.g., within an area similar to area 424). For example, the sensor 114 may capture an image of the pixel array 430 within the area 434 where the reference pixel 432 is intended or expected to be (e.g., an area beneath the input device 110). After capturing an image of the reference pixel 432 (e.g., using particular settings of the sensor 114 for detecting the reference pixel 432), the pixel analyzer 330 of FIG. 3 may determine a location of the input device 110 relative to the pixel array 430 based on a location of the reference pixel in the image. For example, using image processing and input device orientation measurements (from an accelerometer), the pixel analyzer 330 may use any suitable image processing technique to determine a distance and direction from the reference pixel 432.

Therefore, using the captured images illustrated in FIGS. 4A and 4B, the example input device 110 may calibrate itself to the display 122 for enhanced control of the computing device 120 in accordance with the teachings of this disclosure.

Figure 5:
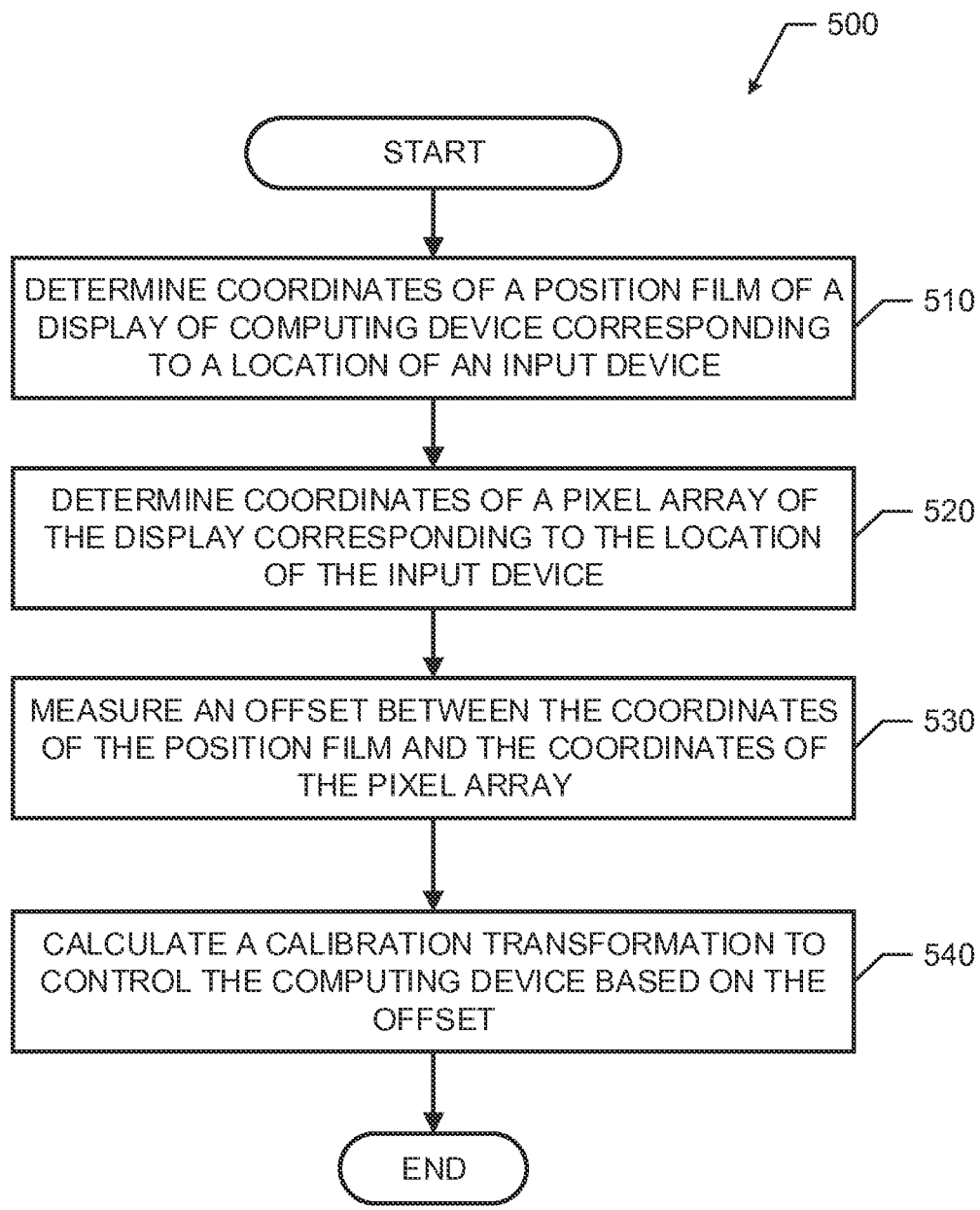
FIG. 5 is a flowchart representative of example machine readable instructions that may be executed to implement the calibrator of FIG. 2 in accordance with an aspect of this disclosure.
Figure 6:
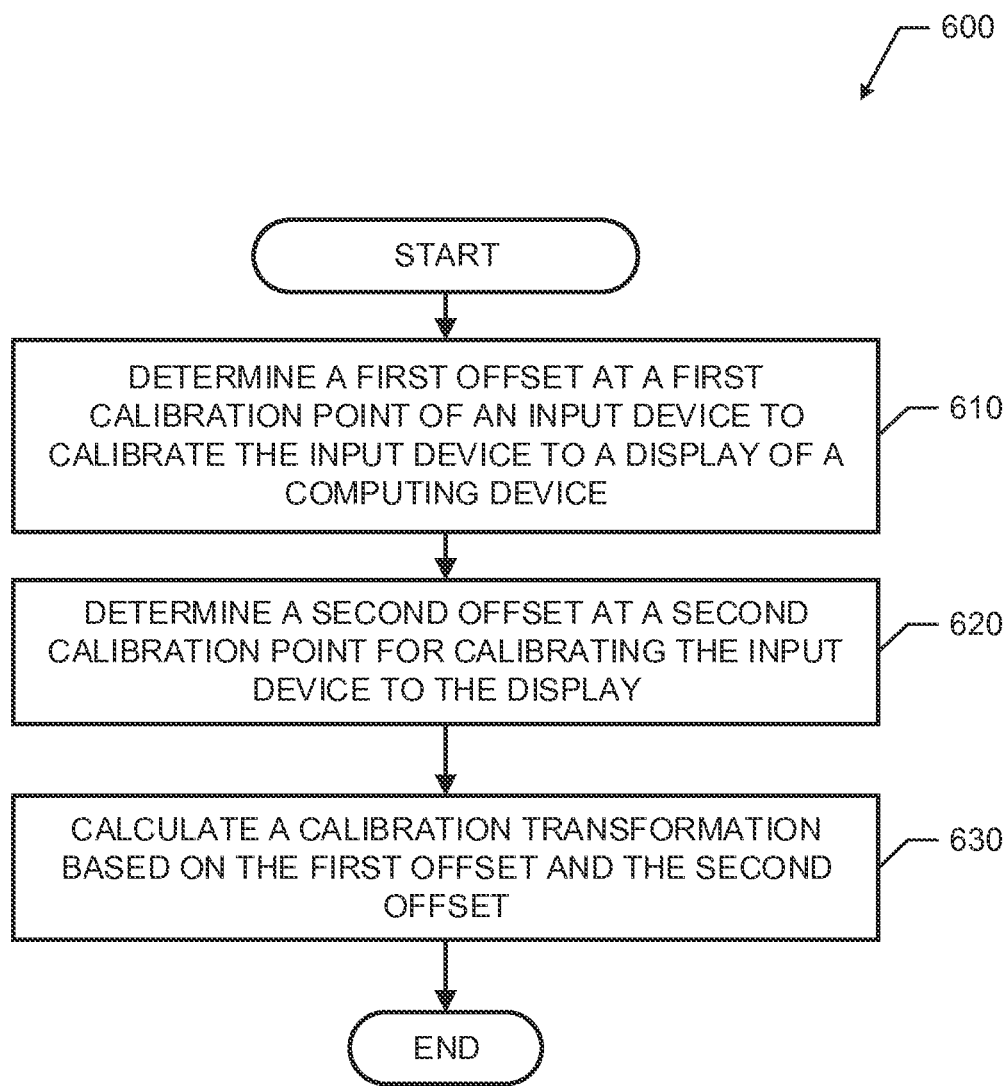
FIG. 6 is a flowchart representative of other example machine readable instructions that may be executed to implement the calibrator of FIG. 2 in accordance with an aspect of this disclosure.

Flowcharts representative of example machine readable instructions for implementing the calibrator 112 of FIG. 2 are shown in FIGS. 5 and 6. In these examples, the machine readable instructions comprise program(s)/process(es) for execution by a processor such as the processor 712 shown in the example processor platform 700 discussed below in connection with FIG. 7. The program(s)/process(es) may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but the entire program/process or parts thereof could alternatively be executed by a device other than the processor 712 or embodied in firmware or dedicated hardware. Further, although the example program(s) is/are described with reference to the flowcharts illustrated in FIGS. 5 and 6, many other methods of implementing the example calibrator 112 may alternatively be used. For example, the order of execution of the blocks may be changed, or some of the blocks described may be changed, eliminated, or combined.

The example process 500 of FIG. 5 begins with an initiation of the calibrator 112 (e.g., upon startup, upon instructions from a user, upon startup of a device implementing the calibrator 112 (e.g., the input device 110), upon entering a calibration mode, etc.). The process 500 in the example of FIG. 5 may be executed to determine an offset between a position-encoded film and a pixel array of a display and calculate a calibration transformation based on the offset. The example process 500 of FIG. 5 may be iteratively repeated. In some examples, the process 500 may be iteratively repeated and average calculations may be made for determining an offset between the position-encoded film and the pixel array.

At block 510 of FIG. 5, the film pattern analyzer 320 of the location detector 210 determines coordinates of the position-encoded film of the display 122 corresponding to a location of the input device 110. For example, at block 520, the film pattern analyzer 320 may analyze images of the position-encoded film captured by the sensor 114 and compare the images to a position encoded pattern of the position-encoded film to determine the coordinates. At block 520, the pixel analyzer 330 of the location detector 210 determines coordinates of the pixel array corresponding to the location of the input device. For example, at block 520, the pixel analyzer 330 may analyze an image of a reference pixel and taken from a same location as the image of the position-encoded film to determine the location of the input device relative to the pixel array.

In FIG. 5, at block 530 the offset calculator 220 calculates an offset between coordinates of the position-encoded film and coordinates of the pixel array. In some examples, the offset calculator 220, at block 530, may calculate a plurality of offsets corresponding to a plurality of calibration points. At block 540, based the calculated offset, the interface manager 230 calculates a calibration transformation to control the computing device based on the offset. For example, at block 540, the interface manager 230 may calculate a rotation, translation, distortion, scaling of the position-encoded film relative to the pixel array for control of the computing device 120 with the input device 110. After block 540, the process 500 of FIG. 5 ends. In some examples, after block 540, control may return to block 510 to execute another iteration of process 500 (e.g., for another calibration point of the input device 110).

The example process 600 of FIG. 5 begins with an initiation of the calibrator 112. The process 600 in the example of FIG. 6 may be executed to determine an offset between a position-encoded film and a pixel array of a display and calculate a calibration transformation based on the offset. At block 610, the calibrator 112 determines a first offset at a first calibration point of the input device 110 to calibrate the input device to the display 122 of the computing device 120. In some examples, the process 500 of FIG. 5 (or portions of it) may be executed to implement block 610 of FIG. 6. At block 620, the calibrator 112 calculates a second offset at a second calibration point of the input device 110 to calibrate the input device to the display. In some examples, the process 500 of FIG. 5 (or portions of it) may be iteratively executed to implement block 610 and block 620 of FIG. 6. At blocks 610 and 620, the calibrator may perform similar operations to calculate the offsets at the respective calibration points. For example, at blocks 610 and 620, the calibrator 112 may determine coordinates of a position-encoded film of the display 122 and coordinates of a pixel array of the display corresponding to a location of the input device 110 (i.e., a location of the calibration point). The calibrator 112 may then calculate the difference between the coordinates of the position-encoded film and the coordinates of the pixel array to determine the offsets at blocks 610 and 620.

At block 630, the calibrator 112 calculates a calibration transformation based on the first offset and the second offset. For example, the calibrator 112 (e.g., via the interface manager 230) may calculate a rotation of the position-encoded film relative to the pixel array or a translation of the position-encoded film relative to the pixel array. In some examples, multiple offsets may be used to calculate distortion of the position-encoded film relative to the pixel array or scaling of the position-encoded film relative to the pixel array. After block 630, the process 600 ends.

As mentioned above, the example processes of FIGS. 5 and 6 may be implemented using coded instructions (e.g., computer or machine readable instructions) stored on a tangible computer readable storage medium such as a hard disk drive, a flash memory, a read-only memory (ROM), a compact disk (CD), a digital versatile disk (DVD), a cache, a random-access memory (RAM) or any other storage device or storage disk in which information is stored for any duration (e.g., for extended time periods, permanently, for brief instances, for temporarily buffering, or for caching of the information). As used herein, the term tangible computer readable storage medium is expressly defined to include any type of computer readable storage device or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer or machine readable instructions) stored on a non-transitory computer or machine readable medium such as a hard disk drive, a flash memory, a read-only memory, a compact disk, a digital versatile disk, a cache, a random-access memory or any other storage device or storage disk in which information is stored for any duration (e.g., for extended time periods, permanently, for brief instances, for temporarily buffering, or for caching of the information). As used herein, the term non-transitory computer readable medium is expressly defined to include any type of computer readable storage device or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
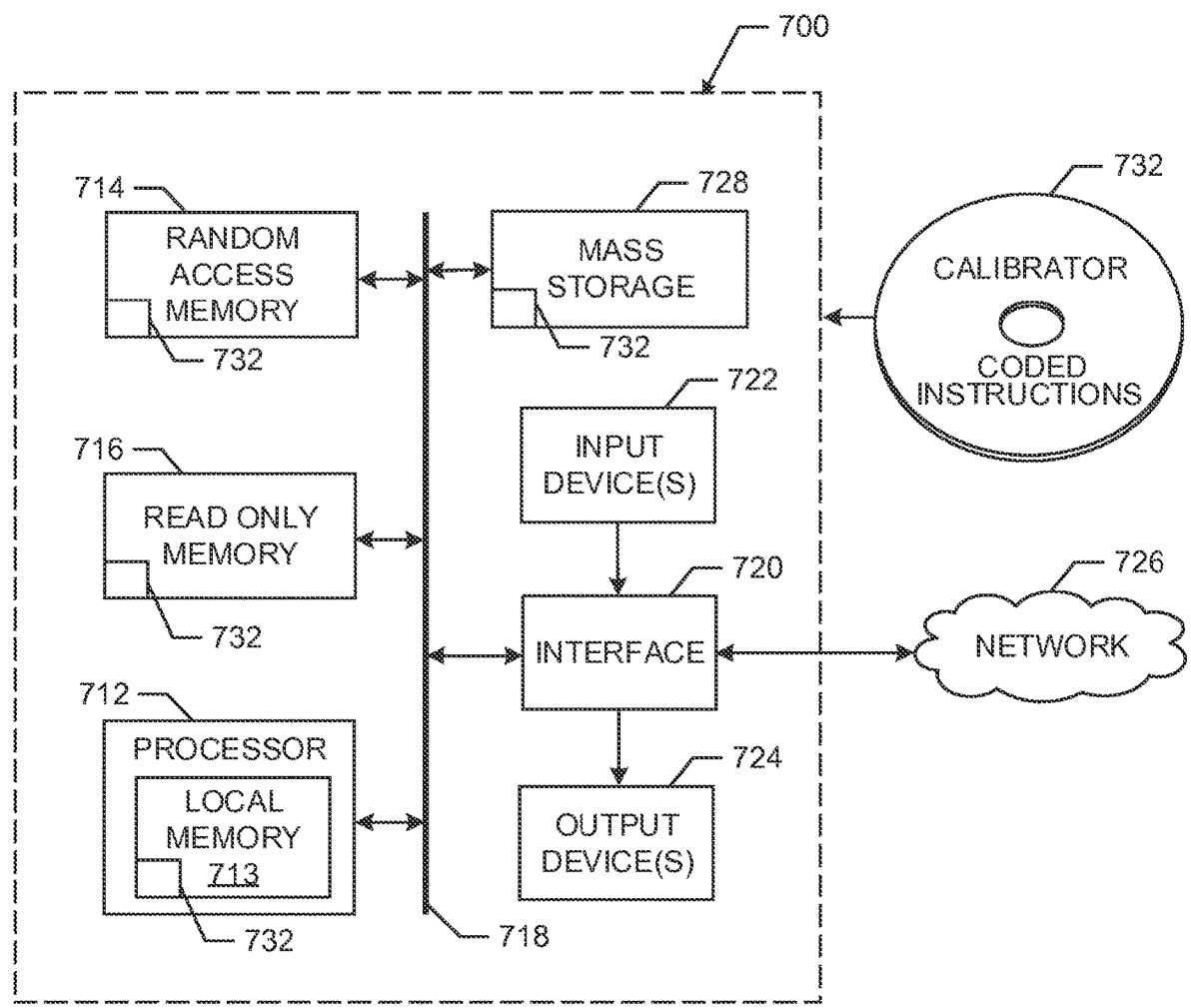
FIG. 7 is a block diagram of an example processor platform capable of executing the instructions of FIG. 5 or 6 to implement the calibrator of FIG. 2.

FIG. 7 is a block diagram of an example processor platform 700 capable of executing the instructions of FIG. 5 or 6 to implement the calibrator 112 of FIG. 2 or the location detector 210 of FIG. 3. The example processor platform 700 may be any apparatus or may be included in any type of apparatus, such as, an input device (e.g., the input device 110, a digital pen, a mouse, a pointer, etc.) a mobile device (e.g., a cell phone, a smart phone, a tablet, etc.), a personal digital assistant (PDA), or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) or any other type of random access memory device. The non-volatile memory 716 may be implemented by flash memory or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a touchscreen, a track-pad, a trackball, isopoint, or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a touchscreen, a tactile output device, a light emitting diode (LED), a printer or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and 6 may be stored in the mass storage device 728, in the local memory 713 in the volatile memory 714, in the non-volatile memory 716, or on a removable tangible computer readable storage medium such as a CD or DVD.

From the foregoing, it will be appreciated that the above disclosed methods, apparatus and articles of manufacture enable an input device to be used to calibrate itself with a display of a computing device to enhance or increase accuracy of controlling the computing device. In examples disclosed herein, the input device may determine its location relative to a position-encoded film of a display and a pixel array of the display using a sensor of the input device. Using images captured by the sensor the input device may calculate an offset or a set of offsets due to misalignment of the position-encoded film and the pixel array. With a high level of accuracy (e.g., within 300 microns), the input device may then be calibrated to the display for enhanced control (e.g., drawing, writing, clicking, etc.) of the computing device. Examples disclosed herein allow for removable or adjustable position-encoded film for a display as the input device may recalibrate itself to the readjusted position-encoded film.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a location detector to determine a geometric location of a position-encoded film of a display of a computing device relative to geometric location of a pixel array of the display;
a sensor controller to instruct the display to change a brightness or a color of a reference pixel;
an offset calculator to determine an offset between the geometric location of the position-encoded film and the geometric location of the pixel array based on the reference pixel; and
an interface manager to calculate a calibration transformation based on the offset, wherein the interface manager is to adjust coordinates of a touched location of the apparatus on the display of the computing device based on the calibration transformation and the coordinates that are adjusted are provided to the computing device to control the computing device.

2. The apparatus as defined in claim 1, wherein the apparatus is a digital pen.

3. The apparatus as defined in claim 1, the location detector to determine the geometric location of the position-encoded film relative to the geometric location of the pixel array by:
determining first coordinates of the position-encoded film corresponding to a location of the apparatus relative to the position-encoded film;
determining second coordinates of the pixel array corresponding to the location of the apparatus relative to the pixel layer,
wherein the offset is determined from a second offset between the first coordinates and the second coordinates.

4. The apparatus as defined in claim 1, further comprising
a sensor to capture a first image of position points of the position-encoded film and to capture a second image of the reference pixel in the first array;
a film pattern analyzer to compare the first image of the position points to a position encoded pattern of the position-encoded film to determine the first coordinates; and
a pixel analyzer to determine the location of the reference pixel within the second captured image to determine the second coordinates.

5. The apparatus as defined in claim 1, further comprising:
a sensor, the sensor to use first settings to detect position points of the position-encoded film and to use second settings to detect the reference pixel in the pixel array using extended image integration time.

6. The apparatus as defined in claim 5, wherein the first settings comprise using an infrared filter of the sensor and an infrared emitter of the sensor.

7. The apparatus as defined in claim 5, wherein the second settings comprise disabling an infrared filter of the sensor and detecting pixel emitted longer visible wavelength light from the reference pixel.

8. The apparatus as defined in claim 1, further comprising:
an image processor, the image processor to use first settings to detect positions points of the position-encoded film within an image and to use second settings to detect a reference pixel in the pixel array in the image.

9. The apparatus as defined in claim 1, wherein the position-encoded film is removable and positioned on an exterior surface of the display.

10. A method comprising:
determining, by a processor of an input device, first coordinates of a position-encoded film corresponding to a location of the input device relative to the position-encoded film of a display of a computing device based on first position points of the position-encoded film;
instructing, by the processor, the display to change a brightness or a color of a first reference pixel;

determining, by the processor, second coordinates of a pixel array corresponding to the location of the input device relative to the pixel array of the display based on the first reference pixel of the display;

measuring, by the processor, a first offset between the first coordinates of the position-encoded film and the second coordinates of the pixel array based on the first reference pixel;

calculating, by the processor, a calibration transformation based on the first offset to adjust coordinates of a touched location of the input device on the display; and transmitting, by the processor, the coordinates that are adjusted to the computing device to control the computing device.

11. The method as defined in claim 10, further comprising:

controlling an aspect of the computing device using the input device based on the coordinates that are adjusted based on the calibration transformation.

12. The method as defined in claim 10, further comprising:

comparing an image of the position-encoded film to a stored position encoded pattern of the position-encoded film to determine the first coordinates, the image captured by a sensor of the input device.

13. The method as defined in claim 10, further comprising:

determining a location of the first reference pixel in an image of the pixel array to determine the second coordinates, the image captured by a sensor of the input device.

14. A non-transitory computer readable storage medium comprising instructions that, when executed by a processor of an input device, cause the processor to:

determine a first offset at a first calibration point of the input device for calibrating the input device to a display of a computing device, the first offset determined by:

determining, using a sensor of the input device, first coordinates of a position-encoded film of the display corresponding to a first location of the input device;

instructing the display to change a brightness or a color of a reference pixel;

determining, using a sensor of the display, first coordinates of a pixel array of the display corresponding to the first location of the input device; and calculating the difference between the first coordinates of the position-encoded film and the first coordinates of the pixel array based on the reference pixel, the difference corresponding to the first offset;

determine a second offset at a second calibration point for calibrating the input device to the display, the second offset determined by:

determining, using the sensor of the input device, second coordinates of the position-encoded film of the display corresponding to a second location of the input device, determining, using the sensor of the display, second coordinates of the pixel array of the display corresponding to the second location of the input device; and calculating the difference between the second coordinates of the position-encoded film and the second coordinates of the pixel array based on the reference pixel, the difference corresponding to the second offset;

calculate a calibration transformation based on the first offset and the second offset, the calibration transformation to adjust coordinates of a touched location of the input device on the display; and transmit the coordinates that are adjusted to the computing device to control the computing device.

15. The non-transitory computer readable storage medium of claim 14, further comprising instructions to cause the machine to:

use first settings of the sensor to capture the first image; and use second settings of the sensor to capture the second image.

* * * * *